United States Patent
Hollis et al.

(10) Patent No.: US 9,123,160 B1
(45) Date of Patent: Sep. 1, 2015

(54) CONCURRENT MESH GENERATION IN A COMPUTER SIMULATION

(75) Inventors: Howell Hollis, Orlando, FL (US); Sean McVey, Orlando, FL (US); Zach Barth, Issaquah, WA (US)

(73) Assignee: Lockheed Martin Corporation, Bethesda, MD (US)

( * ) Notice: Subject to any disclaimer, the term of this patent is extended or adjusted under 35 U.S.C. 154(b) by 155 days.

(21) Appl. No.: 13/611,014

(22) Filed: Sep. 12, 2012

Related U.S. Application Data (60) Provisional application No. 61/553,205, filed on Oct. 30, 2011.

(51) Int. Cl.
  *G06T 15/00* (2011.01)
  *G06T 17/00* (2006.01)
  *G06T 17/05* (2011.01)

(52) U.S. Cl.
  CPC .................................. *G06T 17/05* (2013.01)

(58) Field of Classification Search
  CPC combination set(s) only.
  See application file for complete search history.

(56) References Cited

U.S. PATENT DOCUMENTS

| | | | |
|---|---|---|---|
| 6,707,458 B1 | 3/2004 | Leather et al. | |
| 6,879,324 B1 | 4/2005 | Hoppe | |
| 6,995,761 B1 | 2/2006 | Schroeder et al. | |
| 7,280,109 B2 | 10/2007 | Hoppe | |
| 7,539,606 B2 | 5/2009 | Comair et al. | |
| 7,872,647 B2 | 1/2011 | Mayer et al. | |
| 7,948,485 B1 | 5/2011 | Larsen et al. | |
| 7,983,474 B2 | 7/2011 | Van Workum et al. | |
| 8,638,330 B1 | 1/2014 | Praun et al. | |
| 2001/0035867 A1 | 11/2001 | Murayama et al. | |
| 2002/0101419 A1 | 8/2002 | Cook | |
| 2002/0118190 A1 | 8/2002 | Greasley | |
| 2003/0038816 A1 | 2/2003 | Ohta | |
| 2003/0085895 A1 | 5/2003 | Oka | |
| 2003/0090484 A1 | 5/2003 | Comair et al. | |
| 2003/0112235 A1 | 6/2003 | Grace | |
| 2003/0125111 A1 | 7/2003 | Oka | |
| 2004/0181382 A1 | 9/2004 | Hu et al. | |
| 2006/0018566 A1 | 1/2006 | Coleman et al. | |
| 2006/0170693 A1 * | 8/2006 | Bethune et al. | 345/568 |
| 2006/0176303 A1 * | 8/2006 | Fairclough | 345/426 |
| 2007/0038421 A1 | 2/2007 | Hu et al. | |
| 2007/0257903 A1 | 11/2007 | Gutierrez et al. | |
| 2008/0143713 A1 | 6/2008 | Chiu et al. | |

(Continued)

OTHER PUBLICATIONS

"Boston, Massachusetts Region, Digital Elevation Model with Bathymetry," Harvard Map Collection, Harvard College Library, 2009, 4 pages.

(Continued)

*Primary Examiner* — Jason Repko
*Assistant Examiner* — Leon T Cain, II
(74) *Attorney, Agent, or Firm* — Withrow & Terranova, PLLC (57) ABSTRACT

A mechanism for concurrently generating a plurality of meshes is disclosed. A region of a simulated environment for a simulation is determined. An area that bounds the region is determined. The area is decomposed into a plurality of polygons. Data identifying a first elevation layer at locations in the region and a second elevation layer at the locations in the region is accessed. At least some of the polygons are processed based on a first elevation layer metric associated with the first elevation layer and a second elevation layer metric associated with the second elevation layer to concurrently generate a first mesh and a second mesh that include the at least some of the polygons.

19 Claims, 10 Drawing Sheets

(56) References Cited

U.S. PATENT DOCUMENTS

| | | |
|---|---|---|
| 2008/0208468 A1 | 8/2008 | Martin |
| 2009/0089018 A1* | 4/2009 | Kelley et al. .................... 703/1 |
| 2010/0238161 A1 | 9/2010 | Varga et al. |
| 2011/0055746 A1 | 3/2011 | Mantovani et al. |
| 2011/0295575 A1 | 12/2011 | Levine et al. |

OTHER PUBLICATIONS

"Digital elevation model," Wikipedia, published as early as Feb. 18, 2012, 6 pages.

"Microsoft ESP SDK: Enabling customized and immersive simulation experiences," White Paper, Nov. 2007, 11 pages.

Bruneton, E. et al., "Real-time rendering and editing of vector-based terrains," Eurographics, vol. 27, No. 2, 2008, pp. 311-320.

Pajarola, R., "Large scale terrain visualization using the restricted quadtree triangulation," Proceedings Visualization, vol. 98, Oct. 1998, pp. 19-26.

Szofran, A. et al., "Microsoft ESP: Global terrain technology for Microsoft ESP," Jan. 2008, 22 pages.

Tsai, F. et al., "Adaptive level of detail for large terrain visualization," The International Archives of the Photogrammetry, Remote Sensing and Spatial Information Sciences, vol. XXXVII, Part B4, Beijing, 2008, pp. 579-584.

Non-Final Office Action for U.S. Appl. No. 13/663,619, mailed Dec. 3, 2014, 13 pages.

Pajarola, R., "Overview of Quadtree-based Terrain Triangulation and Visualization," UCI-ICS Technical Report No. 02-01, Department of Information & Computer Science, University of California, Irvine, Jan. 2002, 16 pages.

Non-Final Office Action for U.S. Appl. No. 13/611,199, mailed Sep. 5, 2014, 17 pages.

Notice of Allowance for U.S. Appl. No. 13/611,199, mailed Mar. 11, 2015, 14 pages.

* cited by examiner

CONCURRENT MESH GENERATION IN A COMPUTER SIMULATION

RELATED APPLICATIONS

This application claims the benefit of U.S. provisional patent application No. 61/553,205, filed Oct. 30, 2011, the disclosure of which is incorporated herein by reference in its entirety. The application is related to "MULTI-LAYER DIGITAL ELEVATION MODEL," filed on even date herewith, Ser. No. 13/611,199, which is commonly owned and assigned and is hereby incorporated herein by reference in its entirety.

TECHNICAL FIELD

The embodiments relate to computer simulations, and in particular to mechanisms for concurrently generating multiple meshes used in a computer simulation.

BACKGROUND

A simulator, by way of non-limiting example, a flight simulator, may present to a user a visualization of a virtual environment. The user may typically alter his/her view of the virtual environment by moving the simulated airplane about the simulated environment. In order to represent the terrain, such as the hills, mountains, valleys, and rivers of the virtual environment as realistically as possible, a mesh that closely matches the elevation contour of the terrain that is being simulated may be generated. The mesh may be made up of polygons, each of which may define a planar face, but which collectively approximate the elevation contour of the terrain. Imagery of the terrain may then be mapped to the appropriate polygons in the mesh, ultimately rasterized, and then presented to a user.

In large-scale simulations, where the simulation may encompass vast geographic areas, it may be impractical, impossible, or simply undesirable to generate a mesh of the terrain in advance of the simulation, and thus the mesh may be generated substantially in real time during the simulation. The mesh generation process may be processor intensive, and may be a gating factor in providing a high-fidelity visualization of the environment, since processor cycles utilized to generate a mesh may not be available for other processing tasks associated with the simulation. Accordingly, there is a need for mechanisms and techniques for efficiently generating meshes during a simulation.

SUMMARY

Embodiments relate to mechanisms for concurrently generating multiple meshes for use in a simulation. As the area of a region used in the simulation is decomposed into polygons, multiple meshes may be concurrently generated, eliminating the need to repeatedly decompose the region into polygons for each mesh that is generated. Each mesh may be associated with a different elevation layer in the region, and may comprise vertex entries that define polygons. The vertex entries may include attribute data unique to that elevation layer. Vertex shaders may use the attribute data in the vertex entries to identify particular visual characteristics for rendering.

In one embodiment, a region for use in a simulated environment is determined. The region may be a default region, may be identified via user input, may be based on a configuration parameter, or the like. An area that bounds the region is determined. The area may be defined, by way of non-limiting example, via four points that identify a rectangular area that bounds the region. The area is decomposed into a plurality of polygons. Data that identifies a first elevation layer at locations in the region and a second elevation layer at the locations in the region is accessed. At least some of the polygons are processed based on a first elevation metric associated with the first elevation layer and a second elevation metric associated with the second elevation layer to generate a first mesh and a second mesh that include the at least some of the polygons.

In one embodiment, if a polygon passes the first elevation layer metric, the polygon is stored in the first mesh. If the polygon passes the second elevation layer metric, the polygon is stored in the second mesh. A polygon may pass an elevation layer metric associated with one elevation layer, but may fail the elevation layer metric associated with another elevation layer. If a polygon does not pass all elevation layer metrics, the polygon is further decomposed into multiple additional polygons. By way of non-limiting example, a first polygon may be decomposed into second and third polygons. The second and third polygons may then be tested to determine if they pass the elevation layer metric which the first polygon failed. If so, the second and third polygons are stored in the mesh associated with the respective elevation layer metric. If not, the second and/or third polygons may be further decomposed into additional polygons, and the process repeated until either the decomposed polygons pass the respective elevation layer metric, or a maximum decomposition level is reached, at which point the polygons are stored in the respective mesh.

In one embodiment, the data is obtained from a multi-layer digital elevation model (DEM) structure that identifies the first elevation layer in the region and the second elevation layer in the region. The first elevation layer may be identified at locations in the region at which at least portions of the second elevation layer are identified. Thus, the first and second elevation layers may define different elevations at the same geographic locations.

The multi-layer DEM structure may include first attribute data that is associated with the first elevation layer and second attribute data that is associated with the second elevation layer. The first attribute data from the multi-layer DEM structure may be stored in the first mesh, and the second attribute data may be stored in the second mesh. Based on the attribute data, vertex shading functions may generate vertex entries that identify visual characteristics for rendering.

Those skilled in the art will appreciate the scope of the embodiments and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the embodiments, and together with the description serve to explain the principles of the embodiments.

DETAILED DESCRIPTION

The embodiments set forth below represent the necessary information to enable those skilled in the art to practice the embodiments and illustrate the best mode of practicing the embodiments. Upon reading the following description in light of the accompanying drawings, those skilled in the art will understand the concepts of the embodiments and will recognize applications of these concepts not particularly addressed herein. It should be understood that these concepts and applications fall within the scope of the embodiments and the accompanying claims.

Embodiments relate to the concurrent generation of meshes for use in a simulation. While the embodiments will be described herein in the context of a visualization, the embodiments are not limited to visualizations and have applicability in any context where multiple meshes may be used during a simulation, including object collision detection, whether visualized or not. While aspects of the embodiments will be discussed herein with respect to a restricted quad-tree (RQT) decomposition mechanism, the embodiments may not be limited to the RQT decomposition mechanism, and have applicability to any decomposition mechanism that decomposes a region into polygons, including, by way of non-limiting example, a Delaunay triangulation decomposition mechanism, or the like. Moreover, while for purposes of illustration triangular polygons are discussed herein, the embodiments may not be limited to any particular types of polygons, and have applicability to any polygon decomposition mechanism, irrespective of polygon type.

Figure 1:
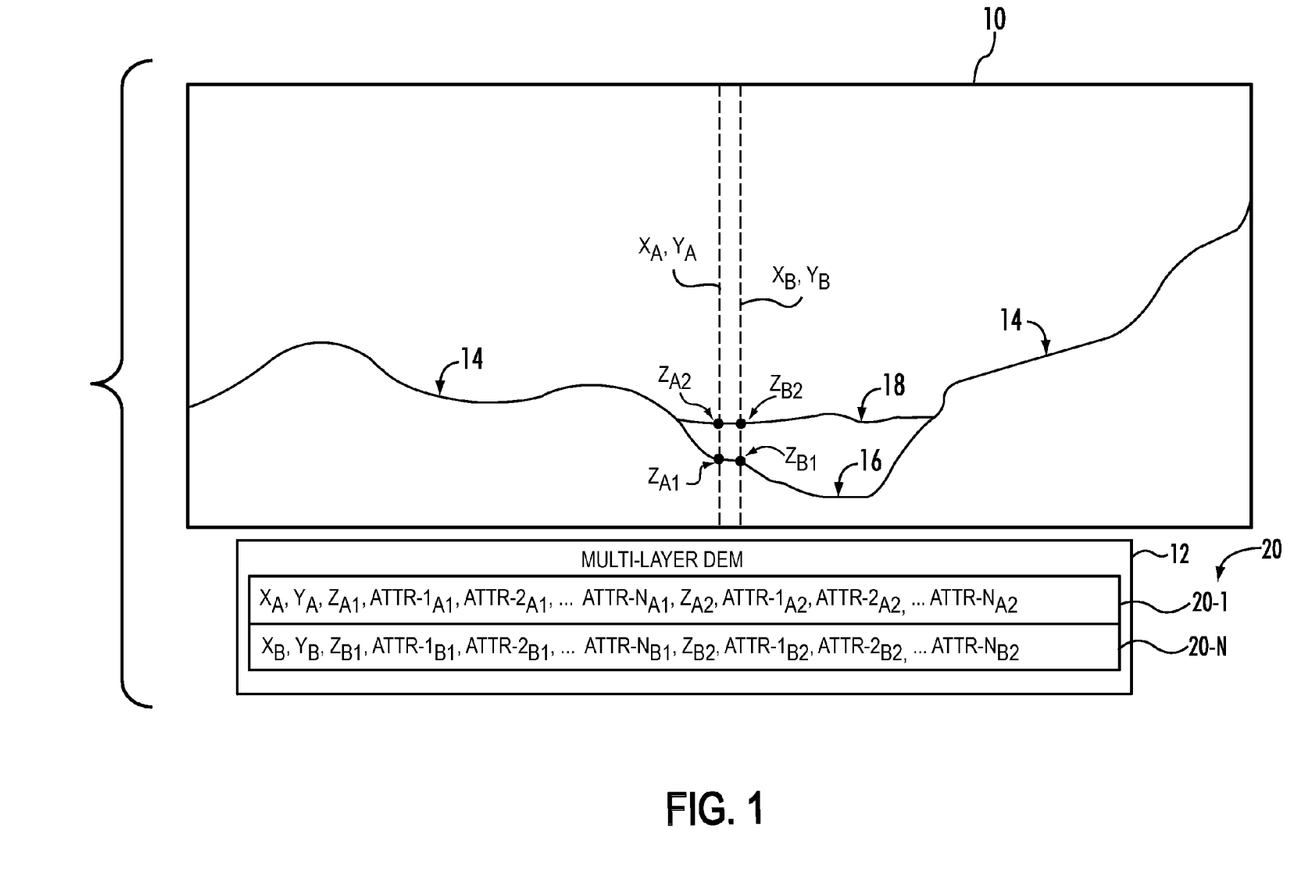
FIG. 1 is a diagram of a region of an environment suitable for a simulation and a multi-layer digital elevation model (DEM) suitable for practicing embodiments disclosed herein.

Prior to delving into the details of the embodiments, digital elevation model data will be briefly discussed and described herein. FIG. 1 is a diagram of an environment 10 suitable for simulating, and a multi-layer digital elevation model (DEM) structure 12 (hereinafter multi-layer DEM 12) suitable for practicing embodiments disclosed herein. As discussed in greater detail herein, the multi-layer DEM 12 may comprise elevation data associated with multiple elevation layers in the environment 10. The environment 10 may comprise some location on earth, by way of non-limiting example. The environment 10 may include various surface types, including a terrain surface type 14, a bathymetric surface type 16, a water surface type 18, and the like. In order for a simulator to simulate the environment 10, the simulator typically accesses elevation data, such as the multi-layer DEM 12, associated with the environment 10; generates a mesh that approximates the elevation contour of the environment 10; and maps appropriate locations of the mesh to corresponding materials and textures so that corresponding imagery can be applied to the mesh, resulting in a simulated environment that closely resembles the environment 10.

The multi-layer DEM 12 may comprise a plurality of DEM entries 20-1-20-N (generally, DEM entries 20), each of which comprises location identifiers that identify a particular location in the environment 10. While for purposes of illustration only two DEM entries 20 are shown, the multi-layer DEM 12 may comprise thousands, or even millions, of DEM entries 20, depending, among other things, on the size of the environment 10 and the resolution at which location identifiers identify locations in the environment 10.

A location in the environment 10 may be identified in any suitable manner, including, by way of non-limiting example, via a latitude value and a longitude value. The DEM entry 20-1 comprises a location identifier that identifies a location at $X_A, Y_A$ in the environment 10, and the DEM entry 20-N comprises a location identifier that identifies a location at $X_B, Y_B$ in the environment 10. In this example, the X coordinate may comprise a particular latitude, and the Y coordinate may comprise a particular longitude. A location in the environment 10 may have one or more associated elevation layers. An elevation layer may be based on an elevation of a particular surface type, such as the elevation of the terrain surface type 14, the elevation of the bathymetric surface type 16, the elevation of the water surface type 18, or may be based on any other desirable criteria, such as the elevation of an underground aquifer in the environment 10, or the elevation of the jet stream in the environment 10, by way of non-limiting example.

For each elevation layer in the environment 10, the multi-layer DEM 12 may identify an elevation value that corresponds to a particular location identifier. The elevation values may be with respect to a reference surface, such as a reference ellipsoid, or the like. Thus, at the location $X_A, Y_A$, the DEM entry 20-1 identifies an elevation value $Z_{A1}$ that identifies the elevation of a first elevation layer at the location $X_A, Y_A$ in the environment 10. Assume for purposes of illustration that the first elevation layer corresponds to the bathymetric surface type 16, and thus identifies an elevation of the bathymetric surfaces (i.e., underwater surfaces) in the environment 10. The DEM entry 20-N identifies an elevation value of $Z_{B1}$ for the first elevation layer at the location $X_B, Y_B$. A second elevation layer in the environment 10 comprises the elevation of water surfaces. Accordingly, the DEM entry 20-1 identifies an elevation value of $Z_{A2}$ that identifies the elevation of the second elevation layer at the location $X_A, Y_A$ in the environment 10. The DEM entry 20-N identifies an elevation value of $Z_{B2}$ that identifies the elevation of the second elevation layer at the location $X_B, Y_B$ in the environment 10. Some elevation layers may exist only at certain locations in the environment 10.

The multi-layer DEM 12 may also identify attribute data for each elevation layer. Attribute data may include information associated with the respective elevation layer at a particular location. Attribute data may comprise any desired information. Non-limiting examples of attribute data may comprise temperature, pressure, or surface type associated with the elevation layer. Different types of attribute data may be relevant to different elevation layers. By way of non-limiting example, for the second elevation layer of the environment 10, the attribute data may comprise sea state attribute data that identifies a sea state that represents water turbulence at a particular location, or clarity attribute data that identifies the clarity of the water at a particular location.

The DEM entry 20-1 identifies attribute data $ATTR\text{-}1_{A1}$, $ATTR\text{-}2_{A1}$, and $ATTR\text{-}N_{A1}$ as being associated with the first elevation layer at location $X_A, Y_A$, and attribute data ATTR- $1_{A2}$, ATTR-$2_{A2}$, and ATTR-$N_{A2}$ as being associated with the second elevation layer at location $X_A, Y_A$. The DEM entry 20-N identifies attribute data ATTR-$1_{B1}$, ATTR-$2_{B1}$, and ATTR-$N_{B1}$ as being associated with the first elevation layer at location $X_B, Y_B$, and attribute data ATTR-$1_{B2}$, ATTR-$2_{B2}$, and ATTR-$N_{B2}$ as being associated with the second elevation layer at location $X_B, Y_B$. As will be discussed in greater detail herein, the attribute data may be used by a simulator for a number of purposes, including, by way of non-limiting example, the determination of an elevation layer metric that may affect the decomposition of an area into polygons, and/or the imagery used to depict the elevation layer during the simulation.

While for purposes of illustration a multi-layer DEM 12 is utilized in various embodiments discussed herein, the embodiments are not limited to the use of a multi-layer DEM 12. Any suitable structure or structures that contain information identifying multiple elevation layers in the environment 10 may be used. Preferably, if multiple structures are accessed, each of which may contain information about a separate elevation layer, such information may be synchronized, or registered, with one another so a simulator can quickly ascertain the elevation values of multiple elevation layers at a same location in the environment 10.

The use of the multi-layer DEM 12, however, may be preferable to the use of multiple single-layer DEM structures. The multi-layer DEM 12 consolidates a substantial amount of information regarding elevation layers, including elevation values and attribute data associated therewith, in a single data structure, reducing processing time and memory fetches of a simulator while generating meshes. A single DEM entry 20 may be used to generate meshes associated with multiple elevation layers, as well as to provide relevant attribute data that corresponds to each elevation layer. Accessing multiple structures to obtain such information may require substantial additional processing power, relatively slow storage operations, and additional memory fetches, which may result in the simulator generating a lower-resolution mesh in order to maintain a desired frame rate of a visualization.

The multi-layer DEM 12 may be generated prior to the initiation of the simulation, or may be generated, by way of non-limiting example, during an initialization phase of the simulation. The multi-layer DEM 12 may be generated in any suitable manner, and may involve accessing multiple different data sources, each of which identifies an elevation layer in the environment 10, and registering one such data source with another such data source to determine the elevation values of the corresponding elevation layers at desired locations in the environment 10. Additional data sources may be accessed to determine relevant attribute data. One mechanism for generating a multi-layer DEM 12 is disclosed in "MULTI-LAYER DIGITAL ELEVATION MODEL", filed on even date herewith, Ser. No. 13/611,199. In one embodiment, the multi-layer DEM 12 may be generated during an initialization phase of the simulation at a desired level of detail based on data determined at run-time, such as user input, user viewpoint location, configuration parameters, or the like.

Figure 2:
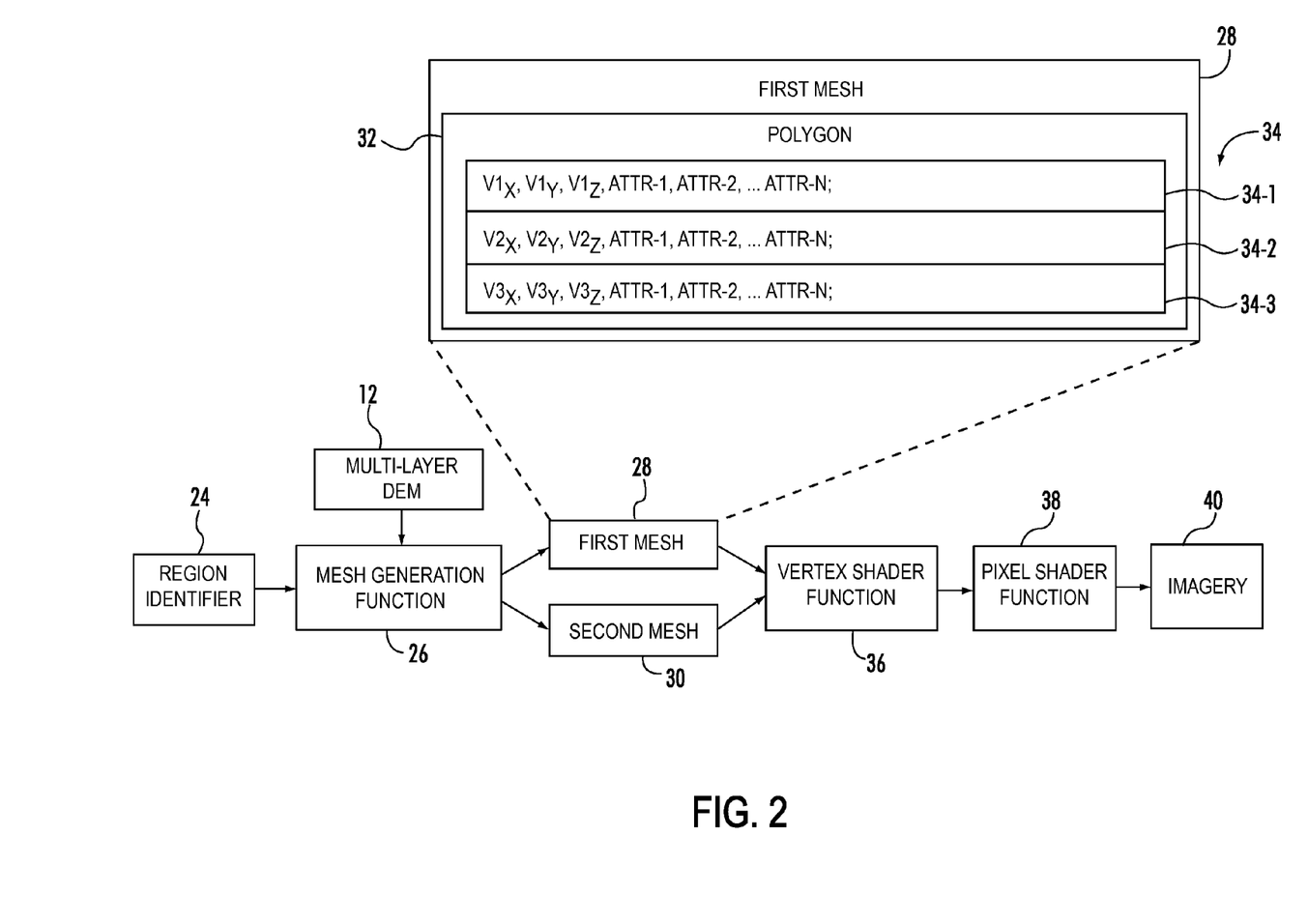
FIG. 2 is a block diagram illustrating functional aspects of a simulator suitable for concurrently generating multiple meshes according to one embodiment.
Figure 3:
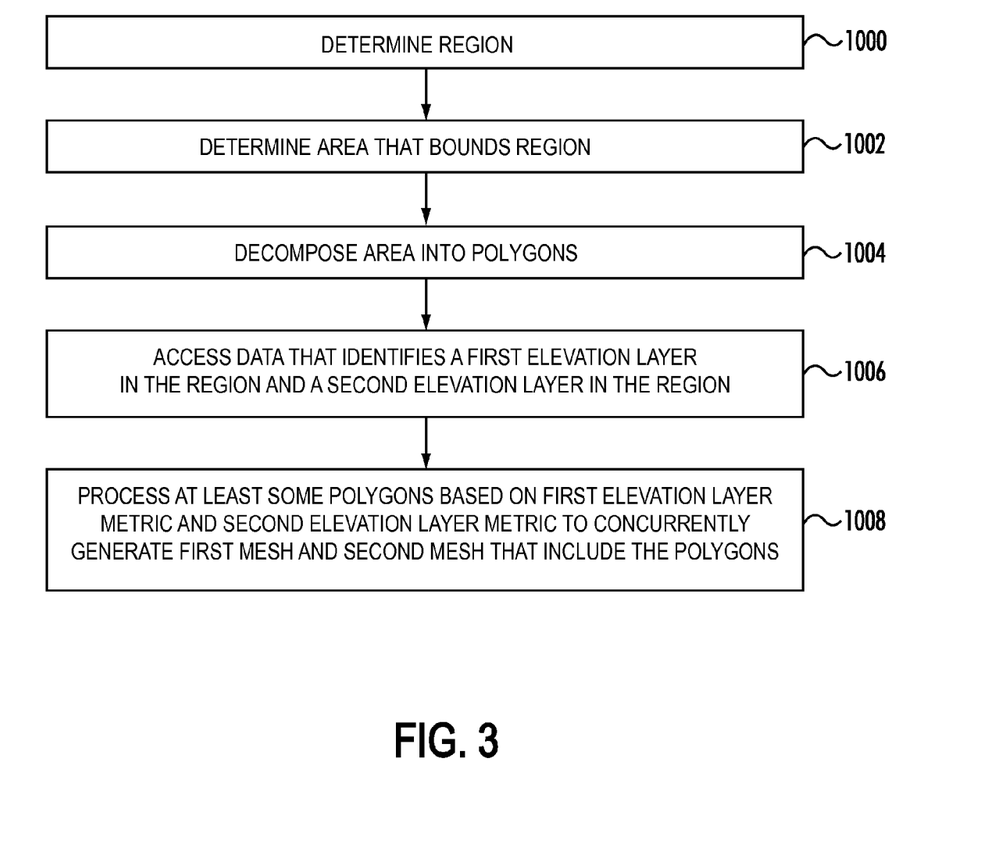
FIG. 3 is a flowchart of a method for concurrently generating multiple meshes according to one embodiment.

FIG. 2 is a block diagram illustrating functional aspects of a device, such as a simulator, suitable for concurrently generating multiple meshes according to one embodiment. FIG. 3 is a flowchart of a method for concurrently generating multiple meshes according to one embodiment, and will be discussed in conjunction with FIG. 2. Initially, a region in a virtual environment may be determined (FIG. 3, step 1000). The region may be identified based on a region identifier 24, which may be determined in any desirable manner, including via user input, a configuration parameter, a viewpoint location of the user in the virtual environment, or the like. An area that bounds the region may be determined (FIG. 3, step 1002). The area may be defined, by way of non-limiting example, by a plurality of points that identify the area of the region in the virtual environment. This area may be of any scale, and could comprise, by way of non-limiting example, an entire continent, or a country, a state, a city, or any other geographic area. In one embodiment, a mesh generation function 26 decomposes the area into polygons (FIG. 3, step 1004). The mesh generation function 26 may comprise any decomposition algorithm, such as a RQT algorithm, a Delaunay triangulation algorithm, or any other algorithm suitable for decomposing an area into geometric shapes.

As part of the decomposition process, the mesh generation function 26 accesses the multi-layer DEM 12, which identifies the first elevation layer in the region and the second elevation layer in the region (FIG. 3, step 1006). As polygons may be generated in the decomposition process, one or more of the polygons may be processed based on a first elevation layer metric that is associated with the first elevation layer and a second elevation layer metric that associated with the second elevation layer to generate a first mesh 28 that may be associated with the first elevation layer and a second mesh 30 that may be associated with the second elevation layer (FIG. 3, step 1008). At the end of the mesh generation process, the first mesh 28 identifies an elevation contour associated with the first elevation layer in the region, and the second mesh 30 identifies an elevation contour associated with the second elevation layer in the region. Accordingly, according to one embodiment, during a single decomposition of the area, multiple meshes may be generated, reducing processing time, memory fetches, and other processing required to generate multiple meshes individually.

The first mesh 28 and the second mesh 30 each comprise a plurality of polygons. Some of the polygons in the first mesh 28 and the second mesh 30 may be identical, and others will differ, as will be described in greater detail herein. As an example, the first mesh 28 comprises a polygon 32 which may be defined via a plurality of vertex entries 34-1-34-3 (generally, vertex entries 34). For purposes of illustration, assume that the polygons in the first mesh 28 and the second mesh 30 comprise triangles, but the embodiments may not be limited to any particular type of polygon. Each vertex entry 34 identifies a vertex of the polygon 32 with respect to the region in a particular elevation layer. By way of non-limiting example, the vertex entry 34-1 identifies a vertex at location $V1_X$, $V1_Y$, $V1_Z$ in the first elevation layer. The location $V1_X$, $V1_Y$, $V1_Z$ may be coordinates in the local world environment of the simulation. While only a single polygon 32 is illustrated, the first mesh 28 may comprise hundreds, thousands, or millions of polygons 32, depending on a variety of factors such as the size of the first elevation layer, the level of detail, and the like. Collectively, the polygons 32 in the first mesh 28 define the elevation contour of the first elevation layer in the region.

The vertex entries 34 may each include attribute data obtained from, or based on, attribute data identified in the multi-layer DEM 12. As discussed above, the attribute data may comprise information that may be used in the decomposition process, by way of non-limiting example, to define an elevation layer metric used to determine if a polygon has been sufficiently decomposed or requires additional decomposition, and may also be used by one or more downstream rendering functions, such as a vertex shader function 36 and/or a pixel shader function 38 to render imagery 40 to a user. In particular, in one embodiment, as a vertex entry 34 may be passed to the vertex shader function 36, the vertex shader function 36 may alter the vertex entry 34 to generate an output vertex entry 34 that identifies a visual characteristic for rendering based on the attribute data contained in the vertex entry 34. By way of non-limiting example, the vertex shader function 36 may alter a visual characteristic relating to a turbulence of a water surface based on a sea state data attribute. The vertex shader function 36 may also, or alternatively, control a transparency of the imagery based on a clarity data attribute. With respect to a bathymetric elevation layer, the vertex shader function 36 may use a depth data attribute and a classification data attribute to generate blend values for multi-texturing. The pixel shader function 38 may receive the output vertex entry 34 from the vertex shader function 36, and may generate or alter the imagery 40 based on the identified visual characteristic. In this manner, extremely realistic imagery may be rendered based on information contained in the mesh itself, eliminating the need to access additional sources of information during the rendering process.

Figure 4:
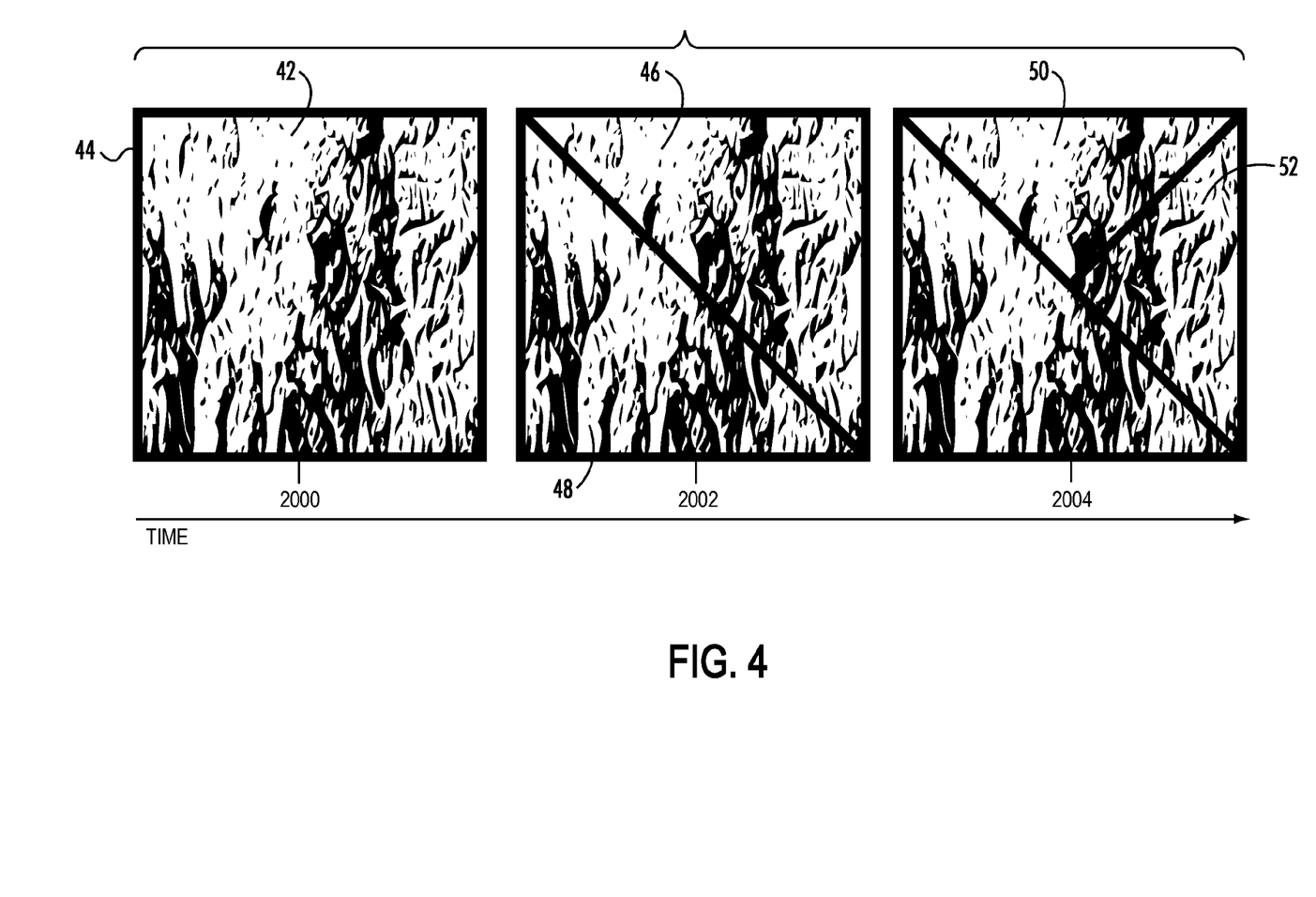
FIG. 4 illustrates a process for concurrently generating multiple meshes by decomposing an area into polygons according to one embodiment.

FIG. 4 illustrates a process for concurrently generating multiple meshes by decomposing an area into polygons according to one embodiment, and will be discussed in conjunction with FIG. 2. Initially, at block 2000, an area 44 may be determined that bounds a region 42. In the example illustrated in FIG. 4, the region 42 comprises a relatively mountainous region of terrain. Referring to block 2002, the area 44 may be initially decomposed into a first polygon 46 and a second polygon 48. The first polygon 46 may be tested against a first elevation layer metric associated with a first elevation layer in the region 42. The first elevation layer metric may comprise, by way of non-limiting example, a threshold elevation difference between any two points of the first polygon 46. The multi-layer DEM 12 (FIG. 2) may be accessed and DEM entries 20 that correspond to each of the three vertices of the first polygon 46 may be obtained. The elevation data associated with the first elevation layer from each DEM entry 20 may be compared to one another to determine whether the polygon passes, or complies with, the first elevation layer metric. If so, then the first polygon 46 may be stored in the first mesh 28, and with respect to the area of the region encompassed by the first polygon 46 and the first elevation layer, no further decomposition of the first polygon 46 may be necessary. While the first elevation layer metric has been defined in terms of the elevation values in the multi-layer DEM 12, the first elevation layer metric may comprise any suitable metric, and may, at least in part, also be based on one or more attributes associated with the first elevation layer and identified in the respective DEM entries 20.

The elevation data associated with the second elevation layer of the DEM entries 20 may then be accessed and compared to a second elevation layer metric to determine if the first polygon 46 complies with the second elevation layer metric. The second elevation layer metric may be different from the first elevation layer metric. If the first polygon 46 complies with the second elevation layer metric, then the first polygon 46 may also be stored in the second mesh 30, and with respect to the area of the region encompassed by the first polygon 46 and the second elevation layer, no further decomposition of the first polygon 46 may be necessary.

Assume, however, that the first polygon 46 passed the first elevation layer metric and was thus stored in the first mesh 28, but failed the second elevation layer metric. Referring to block 2004, the first polygon 46 may then be further decomposed into third polygon 50 and fourth polygon 52. Note that as the first polygon 46 may be decomposed into the third polygon 50 and fourth polygon 52, the resulting third polygon 50 and fourth polygon 52 collectively correspond to the area of the first polygon 46. Because the first polygon 46 passed the first elevation layer metric and was stored in the first mesh 28, the first mesh 28 may be complete with respect to the area encompassed by the first polygon 46. Accordingly, the third polygon 50 and the fourth polygon 52 need not be tested against the first elevation layer metric. The third polygon 50 may be, however, tested against the second elevation layer metric, and if the third polygon 50 passes, or complies with, the second elevation layer metric, the third polygon 50 may be stored in the second mesh 30. Similarly, the fourth polygon 52 may be tested against the second elevation layer metric, and if the fourth polygon 52 passes, or complies with, the second elevation layer metric, the fourth polygon 52 may be stored in the second mesh 30. If either or both of the third polygon 50 and the fourth polygon 52 fail to comply with the second elevation layer metric, such polygons may be further decomposed into additional polygons, and re-tested against the second elevation layer metric until such time as the polygons pass the metric, or until a maximum decomposition level may be reached.

The second polygon 48 may also be, similar to the process described with respect to the first polygon 46, iteratively tested against each respective elevation layer metric and stored in the respective mesh, or further decomposed into additional polygons. At the end of the mesh generation process, the first mesh 28 comprises a plurality of polygons that collectively define the contour of the first elevation layer, and the second mesh 30 comprises a plurality of polygons that collectively define the contour of the second elevation layer.

In one embodiment, the first and second meshes 28, 30 may be used to concurrently render imagery associated with each elevation layer to a user during a visualization. By way of non-limiting example, assume that the first mesh 28 is used to render imagery associated with a bathymetric surface, and the second mesh 30 used to render imagery associated with a water surface at the same locations in the region as the bathymetric surface. Assume, in one embodiment, that the simulator simulates an airplane flying over the respective region. The visualization may depict to the user both a realistic water surface based on the second mesh 30 and aspects of the bathymetry perceivable through the water based on the first mesh 28. Using multiple meshes during such visualizations can create a simulated environment that closely or exactly approximates a real-world analog environment. In another embodiment, the simulator may simulate an underwater vehicle, such as a submarine, wherein a user may be able to perceive both a water surface and a bathymetric surface simultaneously. While the embodiments disclosed herein refer to two elevation layers, the embodiments may not be limited to two elevation layers, and have applicability to any number of elevation layers.

Figure 5:
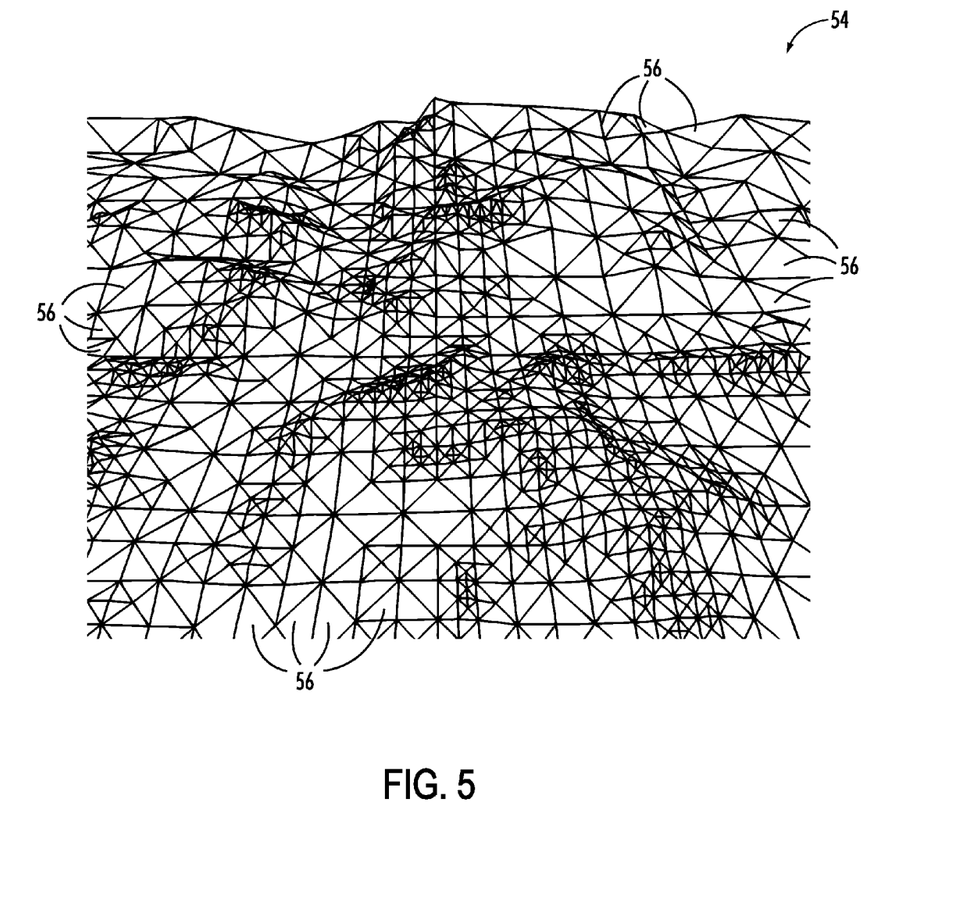
FIG. 5 illustrates a completed mesh of a first elevation layer of a region according to one embodiment.

FIG. 5 illustrates a completed mesh 54 of a first elevation layer of a region according to one embodiment. The mesh 54 comprises a plurality of polygons 56, which collectively define the elevation contour of the first elevation layer of the region. Note that certain areas of the mesh 54 comprise more polygons 56 per square unit than other areas of the mesh 54. Such areas may comprise areas in which the first elevation layer increases or decreases relatively rapidly over a relatively small distance. Thus, larger polygons 56 may initially have been generated in such areas, but failed to comply with a first elevation metric, resulting in further decomposition of the polygons 56 in such areas. The rendering process associates imagery of the region with the polygons 56, and pastes or otherwise applies such imagery to the mesh 54 to generate imagery that closely resembles the real-world analog environment.

FIGS. 6-9 are flowcharts of a mesh generation function 26 (FIG. 2) for concurrently generating multiple meshes according to one embodiment, and will be discussed in conjunction with FIG. 2. For purposes of illustration, the mesh generation function 26 described with respect to FIGS. 6-9 is in the context of a particular decomposition mechanism, in this example an RQT decomposition mechanism, but the embodiments are not limited to any particular decomposition mechanism. In the embodiment described in FIGS. 6-9, an area that bounds a region may be decomposed into a plurality of triangles. Again, as discussed previously, the embodiments are not limited to any particular types of polygons, and may be implemented with, by way of non-limiting example, rectangular, square, or other shapes of polygons.

Figure 6:
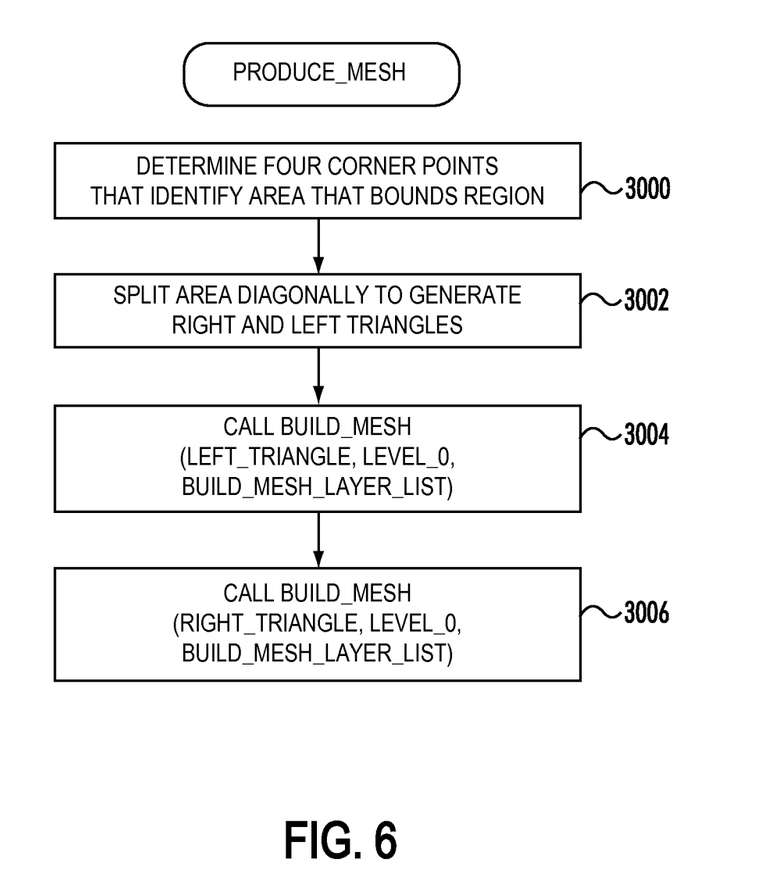
FIG. 6 is a flowchart of a PRODUCE_MESH function which may be called to decompose an area into polygons and concurrently generate multiple meshes according to one embodiment.

FIG. 6 illustrates a process associated with a PRODUCE_MESH function, which may be called to decompose an area into polygons and concurrently generate multiple meshes. Initially, the four corner points that identify an area that bounds a region may be determined (FIG. 6, step 3000). The area may be split diagonally to generate two polygons, in this example, two triangles, referred to as right and left triangles (FIG. 6, step 3002). A BUILD_MESH function may be called and passed in the left triangle, and an indication of an initial level of zero (FIG. 6, step 3004), and the BUILD_MESH function may be called again and passed in the right triangle, and an indication of an initial level of zero (FIG. 6, 3006). In one embodiment, a BUILD_MESH_LAYER_LIST function may be included to identify those layers that should be further decomposed.

Figure 7:
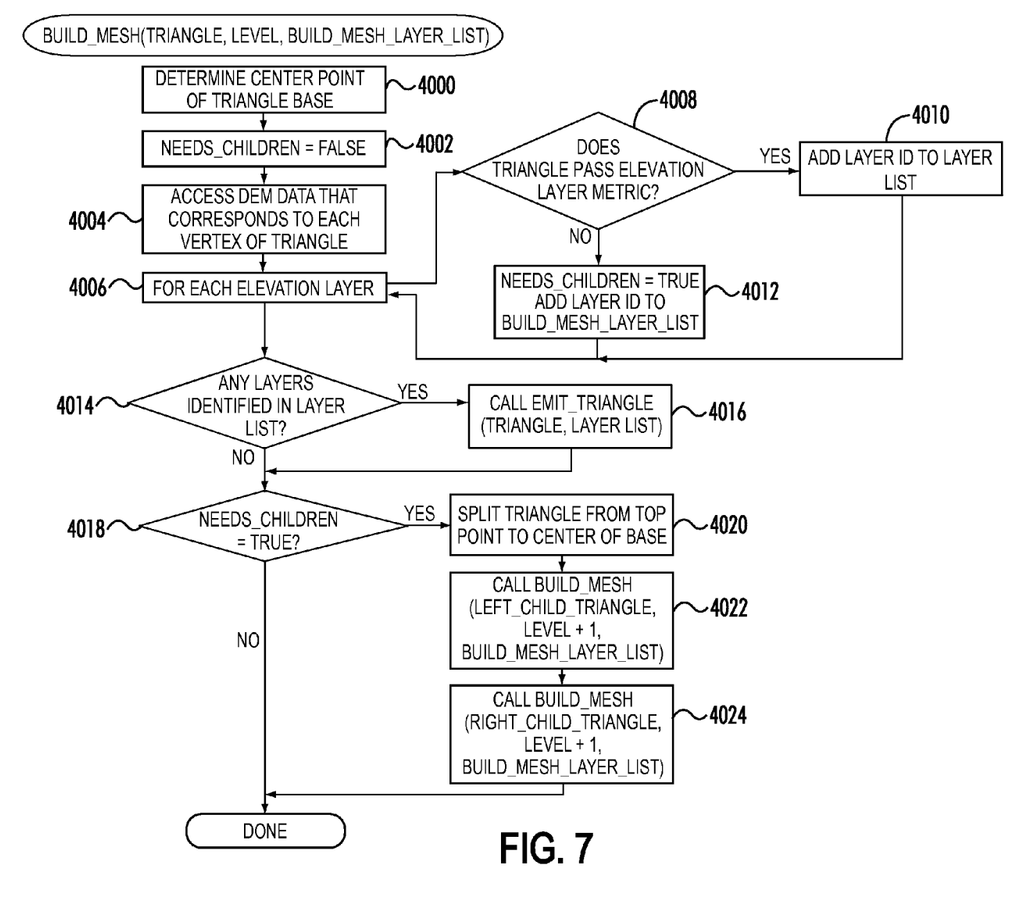
FIG. 7 is a flowchart of a BUILD_MESH function as discussed with regard to FIG. 6 according to one embodiment.

FIG. 7 is a flowchart illustrating a BUILD_MESH function as discussed with regard to FIG. 6. A center point of the base of the triangle passed into the BUILD_MESH function may be determined (FIG. 7, step 4000). A NEED_CHILDREN flag may be initially set to a value of FALSE (FIG. 7, step 4002). The multi-layer DEM 12 (FIG. 1) may be accessed and DEM entries 20 (FIG. 1) which correspond to the vertices of the triangle may be obtained (FIG. 7, step 4004). For the first elevation layer (FIG. 7, step 4006) it may be determined whether the triangle passes the first elevation layer metric (FIG. 7, step 4008). The first elevation layer metric may comprise any suitable criteria or metrics desired to determine the decomposition of triangles. By way of non-limiting example, for each, or for each of a sampling of, DEM entries 20 that identify locations within the area of the triangle a difference may be calculated between the elevation identified in the multi-layer DEM 12 at such location and an elevation of the triangle at such location. If the elevation difference at any such point exceeds a threshold elevation difference, it may be determined that the triangle does not comply with the first elevation layer metric.

Criteria other than elevation data may also be used to determine whether or not a triangle complies with an elevation layer metric. By way of non-limiting example, attribute data stored in the DEM entries 20 may be used in such determination. By way of non-limiting example, polygon decomposition may be based on attribute data stored in the DEM entries 20, such as temperature, pressure, or the like. In one embodiment, as the multi-layer DEM 12 is being generated, certain key locations in the region may be identified in corresponding DEM entries 20 as being locations wherein polygons should be further decomposed due to desired detail in such area of the region, even though elevation changes in such area may be relatively minimal. By way of non-limiting example, shorelines may be such an area in which high polygon detail is desired. The existence of such a location within the triangle may cause the triangle to fail the elevation layer metric, resulting in additional decomposition about such locations.

If the triangle passes the first elevation layer metric, a layer identifier identifying the layer may be added to a layer list which identifies those elevation layers whose metrics the triangle passed (FIG. 7, step 4010). If the triangle does not pass the first elevation layer metric, a layer identifier identifying the layer may be added to a BUILD_MESH_LAYER_LIST to indicate that the layer may be further decomposed, and a NEEDS_CHILDREN flag is set to TRUE (FIG. 7, step 4012). This process may be repeated for each elevation layer (FIG. 7, steps 4006-4012).

After the triangle has been tested against each elevation layer metric, it may be determined whether the layer list includes any layer identifiers (FIG. 7, step 4014). If so, then an EMIT_TRIANGLE function may be called to emit, or store, the respective triangle in the appropriate meshes (FIG. 7, step 4016).

If the NEEDS_CHILDREN flag has a value of true (FIG. 7, step 4018), then the triangle may be decomposed into two additional, smaller triangles by splitting the triangle from a top point of the triangle to a center of the base of the triangle (FIG. 7, step 4020). The BUILD_MESH function may be then recursively called twice, each time with one of the two additional (left and right) triangles, and an indication that the layer has been incremented by a value of one (FIG. 7, steps 4022-4024). The BUILD_MESH function may be repeatedly recursively called, until both the first mesh 28 and the second mesh 30 may be completed.

Figure 8:
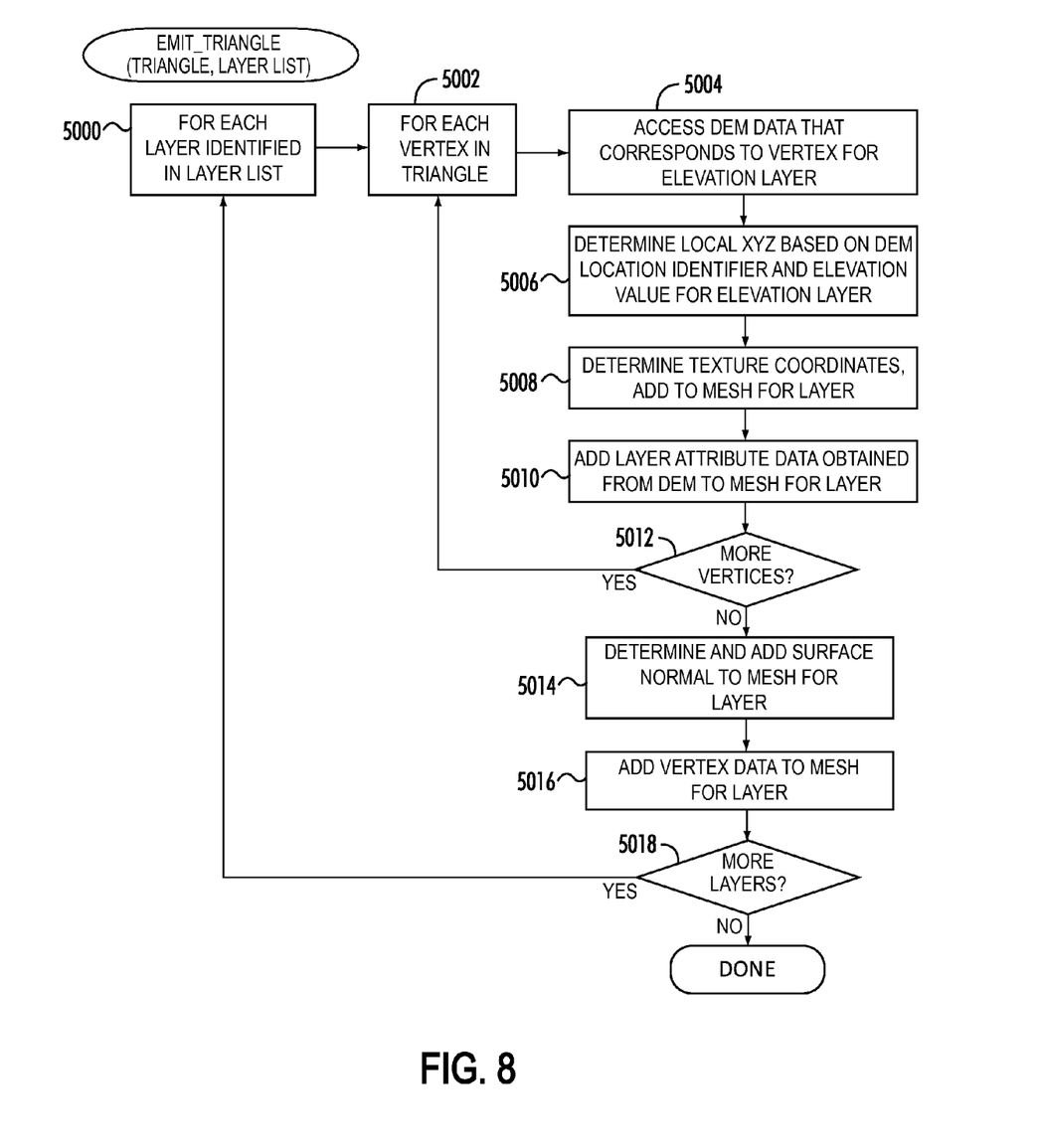
FIG. 8 is a flowchart of a EMIT_TRIANGLE function as discussed with regard to FIG. 7 according to one embodiment.

FIG. 8 is a flowchart of a EMIT_TRIANGLE function as discussed with regard to FIG. 7. The EMIT_TRIANGLE function, in this embodiment, receives a triangle and a layer list identifying the elevation layers for which the triangle passed the elevation layer metric. The triangle may be identified, by way of non-limiting example, via three vertices. For the first elevation layer (FIG. 8, step 5000), a first vertex of the three vertices may be accessed (FIG. 8, step 5002). A vertex entry may be generated. The multi-layer DEM 12 may be accessed to obtain a DEM entry 20 that corresponds to the location of the vertex in the region (FIG. 8, step 5004). Local X,Y,Z coordinates in local space may be determined based on the location identifier in the DEM entry 20 and the elevation value for the respective elevation layer, and may be added to the vertex entry (FIG. 8, step 5006). Texture coordinates may then be determined based on the location of the vertex in the region, and added to the vertex entry in the mesh for this vertex (FIG. 8, step 5008). Attribute data may be obtained from the DEM entry 20 and added to the vertex entry in the mesh (FIG. 8, step 5010). If more vertexes remain to be processed, the process repeats for each vertex (FIG. 8, steps 5012, 5002-5010).

After each vertex is processed, a surface normal may be determined based on the three vertexes, and added to each vertex entry in the mesh (FIG. 8, step 5014). The vertex entries may then be stored in the respective mesh (FIG. 8, step 5016). If additional layers exist, this process may be repeated for each layer identified in the layer list (FIG. 8, steps 5018, 5000-5016).

Figure 9:
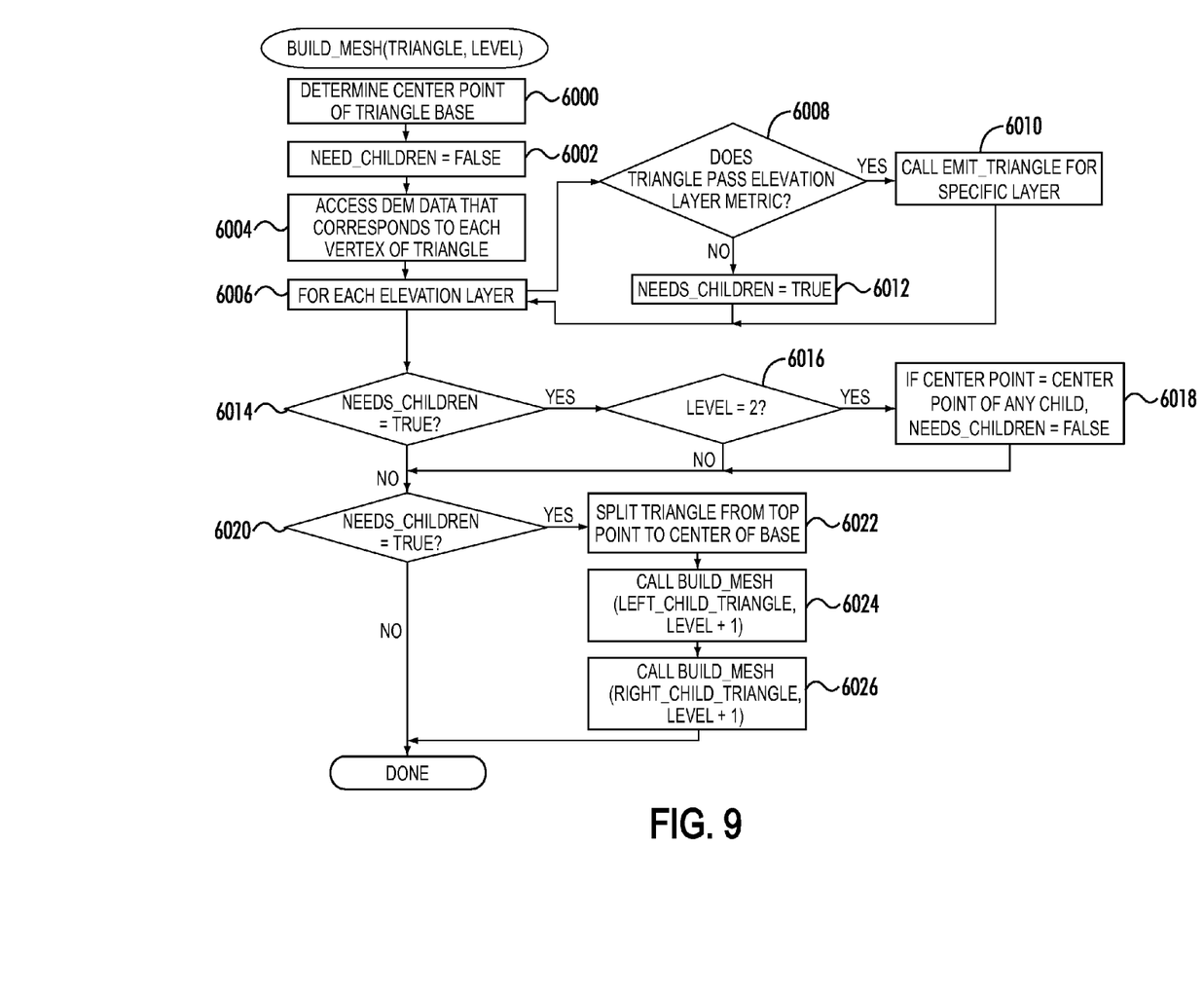
FIG. 9 is a flowchart of another BUILD_MESH function as discussed with regard to FIG. 6 according to another embodiment.

FIG. 9 is a flowchart illustrating another BUILD_MESH function as discussed with regard to FIG. 6. In this embodiment, steps 6000-6008 correspond to and may be substantially the same as steps 4000-4008 of FIG. 7, respectively, and for the purposes of brevity will not be discussed in detail herein. If at step 6008 it may be determined that the triangle passes the elevation layer metric, then an EMIT_TRIANGLE function associated with that particular elevation layer may be called. Thus, in contrast to the embodiment disclosed in FIG. 7, wherein a single EMIT_TRIANGLE function may be called with a layer list identifying the elevation layers for which a triangle passed, in this embodiment separate EMIT_TRIANGLE functions may be developed, each one being developed for a particular elevation layer. As it may be determined that a triangle passes a particular elevation layer metric, the corresponding EMIT_TRIANGLE function may be called to handle the generation of vertex data and storage thereof in the appropriate mesh, similar to the manner discussed above with regard to FIG. 8. This process is repeated for each elevation layer (FIG. 9, steps 6006-6012). Steps 6014-6026 may be substantially similar to steps 4018-4030 of FIG. 7, respectively, and for the purposes of brevity will not be discussed in detail herein.

While the embodiments herein have been discussed in conjunction with a visualization, the embodiments have applicability in any application wherein it may be desirable to generate multiple meshes, including, by way of non-limiting examples, in gaming and entertainment applications, desktop and laptop training applications, weather visualization applications, virtual earth and mapping applications, mobile device applications, and the like.

While for purposes of illustration the embodiments have been described in the context of a single region, those of skill in the art will recognize that in a simulation, the region for which a mesh may be generated may continually change as the user moves about the virtual environment in the simulated vehicle. Thus, the processes described herein may continually and iteratively process and generate multiple meshes based on the multi-layer DEM 12 as the region changes in response to user input. The user input could comprise, by way of non-limiting example, input via a keyboard, a mouse, a joystick, or a gaming controller, or could be based on voice commands, a touch interface, a tilt interface, 3D trackers, or head-mounted displays, to name a few non-limiting examples. In some embodiments, the movement about the region may be controlled automatically in response to a GPS tracking position or a pre-recorded camera path, via artificial intelligence algorithms, or via another method.

Figure 10:
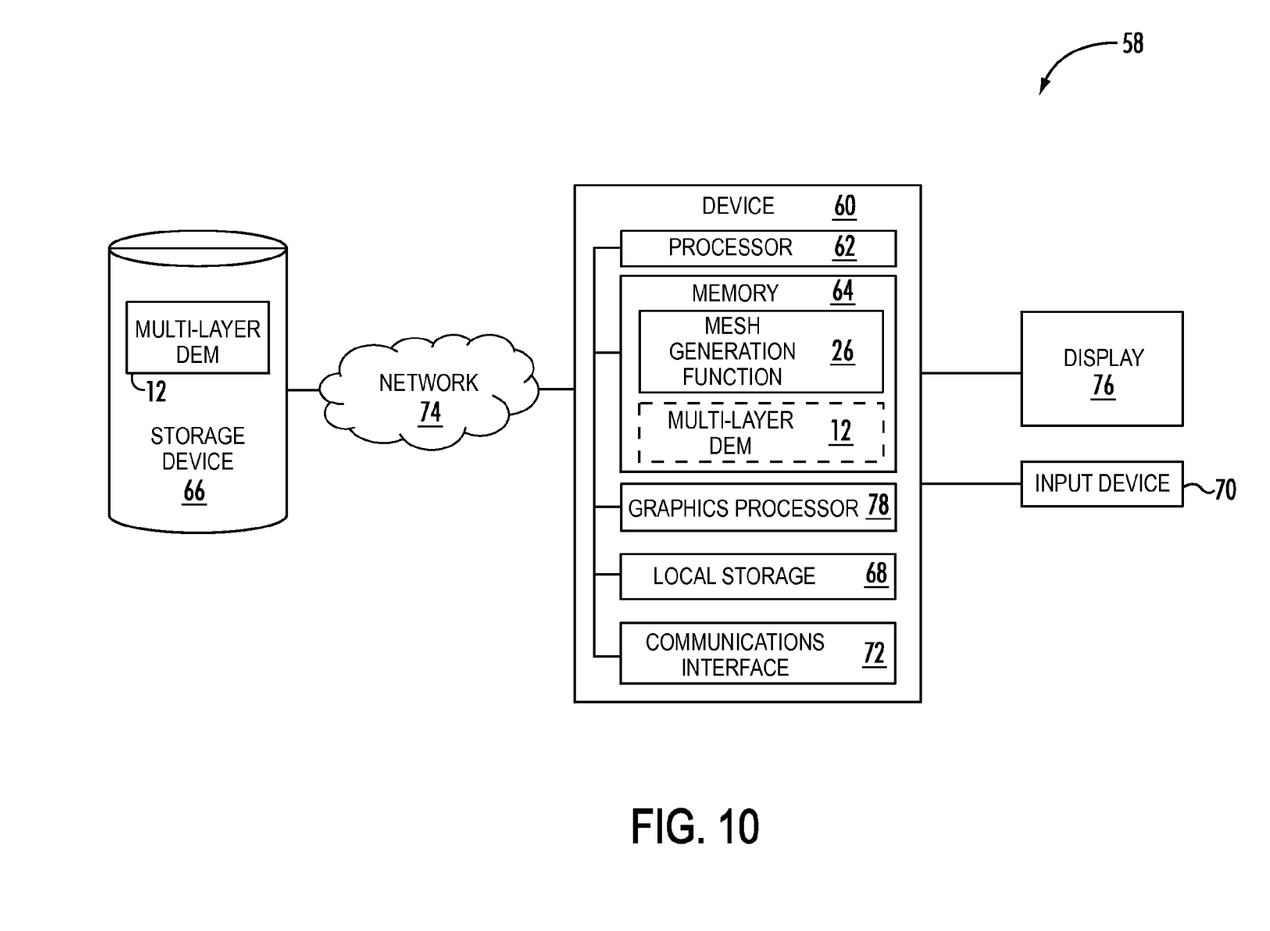
FIG. 10 is a block diagram of a system suitable for practicing aspects of the embodiments, according to one embodiment.

FIG. 10 is a block diagram of a system 58 suitable for practicing aspects of the embodiments. The system 58 includes a device 60 which may comprise, by way of non-limiting example, a laptop computer, a desktop computer, a workstation, a server, or any other processing device, include special-purpose processing devices, capable of implementing the functionality described herein. The device 60 includes a processor 62 coupled to a memory 64. The processor 62 can be any of various commercially available or proprietary processors. Dual microprocessors and other multi-processor architectures may also be employed as the processor 62.

The memory 64 may comprise volatile memory (e.g., random access memory (RAM), and may store, in some embodiments, the multi-layer DEM 12. Alternatively, the multi-layer DEM 12 may be stored in a storage device 66. In one embodiment, a first multi-layer DEM 12 having a particular level of detail (LOD) may be stored in the storage device 66, and a second multi-layer DEM 12, having a different LOD that is determined during an initialization phase of the simulator, may be generated and stored in the memory 64 during the initialization phase. The device 60 may further include a local storage 68, which may comprise, by way of non-limiting example, an internal hard disk drive (HDD) (e.g., enhanced integrated drive electronics (EIDE) or serial advanced technology attachment (SATA)) for storage, solid-state memory, flash memory, or the like. The local storage 68 may comprise computer-readable and computer-usable media that provide non-volatile storage of data and data structures such as the multi-layer DEM 12 and the like, as well as computer-executable instructions for implementing functionality described herein. Although the description of computer-readable media above refers to an HDD, it should be appreciated by those skilled in the art that other types of media which may be readable by a computer, such as Zip disks, magnetic cassettes, flash memory cards, cartridges, and the like, may also be used in the operating environment, and further, that any such media may contain computer-executable instructions for performing the novel functionality described herein.

A number of modules can be stored in the local storage 68 and in the memory 64, including an operating system (not illustrated) and one or more program modules, such as the mesh generation function 26 (FIG. 1), which may implement the functionality described herein in whole or in part. It is to be appreciated that the embodiments can be implemented with various commercially available operating systems or combinations of operating systems.

All or a portion of the embodiments may be implemented as a computer program product, such as a non-transitory computer-usable or computer-readable medium having a computer-readable program code embodied therein. The computer-readable program code can include complex software instructions for implementing the functionality of the embodiments described herein when executed on the processor 62. The processor 62, in conjunction with the mesh generation function 26 and other program modules in the memory 64, may serve as a controller, or as a control system, for the device 60 that is configured to, or adapted to, implement the functionality described herein.

A user may be able to enter commands and information into the device 60 through one or more input devices 70, such as, by way of non-limiting example, a touch-sensitive display screen; a keyboard; or a pointing device, such as a mouse. Other input devices may include a microphone, an infrared (IR) remote control, a joystick, a game pad, a stylus pen, or the like. These and other input devices may be often connected to the processor 62 through an input device interface (not illustrated). The device 60 may also include a communications interface 72 that may be configured to communicate with a network 74. The device 60 may drive one or more display devices 76, via which simulations may be provided to a user, by way of non-limiting example. The device 60 may also include one or more graphics processors 78. The graphics processor 78 may implement certain functionality, such as the vertex shader function 36 or the pixel shader function 38 (FIG. 2), responsible for the rendering of imagery based on the first mesh 28 and the second mesh 30.

Those skilled in the art will recognize improvements and modifications to the embodiments. All such improvements and modifications are considered within the scope of the concepts disclosed herein and the claims that follow.

What is claimed is:
1. A method, comprising:
determining, by a device, an area that bounds a region;
decomposing the area into a plurality of polygons;
accessing, by the device, data identifying a first elevation layer at locations in the region and a second elevation layer at same locations in the region; and
processing at least some of the plurality of polygons based on a first elevation layer metric associated with the first elevation layer and
a second elevation layer metric associated with the second elevation layer at the same locations in the region to concurrently generate a first mesh for the first elevation layer and a second mesh for the second elevation layer at the same locations in the region, wherein the processing includes:

determining that a first polygon of the at least some of the plurality of polygons passes the first elevation layer metric and, based on determining that the first polygon passes the first elevation layer metric, storing the first polygon in the first mesh; and determining that the first polygon fails the second elevation layer metric and, based on determining that the first polygon fails the second elevation layer metric, decomposing the first polygon into a second polygon and a third polygon.

2. The method of claim 1, wherein processing the at least some of the plurality of polygons further comprises:

determining that a fourth polygon of the at least some of the plurality of polygons passes the first elevation layer metric, and based on determining that the fourth polygon passes the first elevation layer metric, storing the fourth polygon in the first mesh.

3. The method of claim 2, wherein processing the at least some of the plurality of polygons further comprises:

determining that the fourth polygon passes the second elevation layer metric and, based on determining that the fourth polygon passes the second elevation layer metric, storing the fourth polygon in the second mesh.

4. The method of claim 1, wherein processing the at least some of the plurality of polygons further comprises:

determining that the second polygon passes the second elevation layer metric and, based on determining that the second polygon passes the second elevation layer metric, storing the second polygon in the second mesh; and determining that the third polygon fails the second elevation layer metric and, based on determining that the third polygon fails the second elevation layer metric, decomposing the third polygon into a fourth polygon and a fifth polygon.

5. The method of claim 1, wherein decomposing the area into the plurality of polygons comprises triangulating the area into a plurality of triangles.

6. The method of claim 5, wherein triangulating the area into the plurality of triangles comprises using a restrictive quad tree algorithm recursively to triangulate the area into the plurality of triangles.

7. The method of claim 1, wherein the data identifying the first elevation layer at the locations in the region and the second elevation layer at the same locations in the region comprises a multi-layer digital elevation model (DEM) that identifies the first elevation layer at the locations in the region and the second elevation layer at the same locations in the region.

8. The method of claim 7, further comprising:

storing, in the first mesh, first attribute data obtained from the multi-layer DEM; and storing, in the second mesh, second attribute data obtained from the multi-layer DEM.

9. The method of claim 8, wherein the first mesh comprises a first plurality of polygons, each polygon of the first plurality of polygons being defined by a plurality of vertex entries, and wherein storing, in the first mesh, the first attribute data obtained from the multi-layer DEM comprises:

determining, for each of the plurality of vertex entries of a first polygon of the first plurality of polygons, corresponding DEM entries, the corresponding DEM entries each comprising a location identifier and the first attribute data associated with the first elevation layer at the location identified by the location identifier; and storing, in the first mesh, for each of the plurality of vertex entries of the first polygon, the first attribute data identified by the corresponding DEM entry.

10. The method of claim 9, further comprising:

receiving, by a vertex shader function, a vertex entry associated with a polygon from the first mesh, the vertex entry comprising a vertex identifier and the first attribute data; and generating an output vertex entry that identifies a visual characteristic for rendering based on the first attribute data.

11. The method of claim 9, wherein the second mesh comprises a second plurality of polygons, each polygon of the second plurality of polygons being defined by a plurality of vertex entries, and wherein storing, in the second mesh, the second attribute data obtained from the multi-layer DEM comprises:

determining, for each of the plurality of vertex entries of a second polygon of the second plurality of polygons, corresponding DEM entries, the corresponding DEM entries each comprising a location identifier and second attribute data associated with the second elevation layer at the location identified by the location identifier; and storing, in the second mesh, for each of the plurality of vertex entries, the second attribute data identified by the corresponding DEM entry.

12. The method of claim 11, wherein the plurality of vertex entries of the first polygon and the plurality of vertex entries of the second polygon correspond to the same DEM entries.

13. The method of claim 1, further comprising:

receiving, by a graphics processor, the first mesh and the second mesh; and rendering, by the graphics processor, first elevation layer imagery based on the first mesh and second elevation layer imagery based on the second mesh.

14. A device, comprising:

a memory; and one or more processors coupled to the memory, and configured to:

determine a region of a simulated environment for a simulation;

determine an area that bounds the region;

decompose the area into a plurality of polygons;

access data identifying a first elevation layer at locations in the region and a second elevation layer at same locations in the region; and process at least some of the plurality of polygons based on a first elevation layer metric associated with the first elevation layer and a second elevation layer metric associated with the second elevation layer at the same locations in the region to concurrently generate a first mesh for the first elevation layer and a second mesh for the second elevation layer at the same locations in the region, wherein to process the at least some of the plurality of polygons the one or more processors are further configured to:

determine that a first polygon of the at least some of the plurality of polygons passes the first elevation layer metric and, based on determining that the first polygon passes the first elevation layer metric, storing the first polygon in the first mesh; and determine that the first polygon fails the second elevation layer metric and, based on determining that the first polygon fails the second elevation layer metric, decomposing the first polygon into a second polygon and a third polygon.

15. The device of claim 14, wherein to process the at least some of the plurality of polygons, the one or more processors are further configured to:

determine that a fourth polygon of the at least some of the plurality of polygons passes the first elevation layer metric and, based on determining that the fourth polygon passes the first elevation layer metric, store the fourth polygon in the first mesh.

16. The device of claim 15, wherein to process the at least some of the plurality of polygons, the one or more processors are further configured to determine that the fourth polygon passes the second elevation layer metric and, based on determining that the fourth polygon passes the second elevation layer metric, store the fourth polygon in the second mesh.

17. The device of claim 14, wherein the data identifying the first elevation layer at the locations in the region and the second elevation layer at the same locations in the region comprises a multi-layer digital elevation model (DEM) that identifies the first elevation layer at the locations in the region and the second elevation layer at the same locations in the region.

18. A method, comprising:
    determining, by a device, a region of a virtual environment;
    decomposing the region into a plurality of polygons;
    obtaining, by the device, data that identifies a first elevation layer in the region and a second elevation layer in the region; and
    based on the data and a first elevation layer metric associated with the first elevation layer and a second elevation layer metric associated with the second elevation layer, concurrently generating a first mesh that is associated with the first elevation layer and a second mesh that is associated with the second elevation layer at least in part by:
        determining that a first polygon of the at least some of the plurality of polygons passes the first elevation layer metric and, based on determining that the first polygon passes the first elevation layer metric, storing the first polygon in the first mesh; and
        determining that the first polygon fails the second elevation layer metric and, based on determining that the first polygon fails the second elevation layer metric, decomposing the first polygon into a second polygon and a third polygon.

19. The method of claim 18, wherein obtaining, by the device, the data that identifies the first elevation layer in the region and the second elevation layer in the region comprises accessing a multi-layer digital elevation model (DEM) that identifies the first elevation layer in the region and the second elevation layer in the region.

* * * * *